(12) United States Patent
    Natsume

(10) Patent No.: US 12,655,881 B2
(45) Date of Patent: Jun. 16, 2026

(54) STRUCTURE

(71) Applicant: NATURE ARCHITECTS INC., Tokyo (JP)

(72) Inventor: Hiroaki Natsume, Tokyo (JP)

(73) Assignee: NATURE ARCHITECTS INC., Tokyo (JP)

( * ) Notice: Subject to any disclaimer, the term of this patent is extended or adjusted under 35 U.S.C. 154(b) by 378 days.

(21) Appl. No.: 18/292,502

(22) PCT Filed: Jul. 30, 2021

(86) PCT No.: PCT/JP2021/028338
    § 371 (c)(1),
    (2) Date: Jan. 26, 2024

(87) PCT Pub. No.: WO2023/007703
    PCT Pub. Date: Feb. 2, 2023

(65) Prior Publication Data
    US 2024/0344579 A1      Oct. 17, 2024

(51) Int. Cl.
    *F16F 1/373* (2006.01)
(52) U.S. Cl.
    CPC .................................... *F16F 1/373* (2013.01)
(58) Field of Classification Search
    CPC ........ F16F 1/373; F16F 3/0873; F16F 1/3732; F16F 1/377; F16F 2228/063
    USPC .............................................. 267/141, 141.1
    See application file for complete search history.

(56) References Cited

U.S. PATENT DOCUMENTS

| | | | | |
|---|---|---|---|---|
| 5,280,890 | A * | 1/1994 | Wydra .................... | F16F 1/426 |
| | | | | 267/153 |
| 9,531,319 | B2 * | 12/2016 | Braunstein .............. | H02S 20/23 |
| 11,022,195 | B2 * | 6/2021 | Werner ................... | F16F 13/14 |
| 2002/0108808 | A1 * | 8/2002 | Kaku .................... | F16F 3/0873 |
| | | | | 181/207 |

(Continued)

FOREIGN PATENT DOCUMENTS

| | | |
|---|---|---|
| CN | 102678804 A | 9/2012 |
| CN | 112178121 A | 1/2021 |

(Continued)

OTHER PUBLICATIONS

Jun. 2, 2025 Extended European Search Report Issued in European Patent Application No. 21951902.2.

(Continued)

*Primary Examiner* — Muhammad Ijaz
(74) *Attorney, Agent, or Firm* — Oliff PLC

(57) ABSTRACT

The structure includes a pressure receiving section configured to receive an external pressing force or a reaction force due to the pressing force. The structure further includes a frame section, a first elastic section that is connected to the pressure receiving section and to the frame section and has positive stiffness in any displacement range of the pressure receiving section, a second elastic section that is connected to the pressure receiving section and to the frame section and has negative stiffness in a predetermined displacement range of the pressure receiving section, and a deformation suppressing section that is connected to the frame section and is configured to suppress deformation of the frame section due to deformation of the second elastic section by displacement of the pressure receiving section.

8 Claims, 7 Drawing Sheets

(56)     References Cited

U.S. PATENT DOCUMENTS

| | | | | |
|---|---|---|---|---|
| 2011/0109028 A1* | 5/2011 | Zabelka | ............... | F16F 1/3615 |
| | | | | 267/153 |
| 2011/0169516 A1 | 7/2011 | McFarland | | |
| 2013/0334746 A1* | 12/2013 | Lobry | .................. | A47C 23/067 |
| | | | | 267/89 |
| 2015/0014510 A1 | 1/2015 | Dunning | | |
| 2015/0180374 A1 | 6/2015 | Herder et al. | | |
| 2017/0252877 A1* | 9/2017 | Aubert | .................... | B29C 45/14 |
| 2018/0216688 A1* | 8/2018 | Steinmaier | .............. | F01N 13/16 |
| 2020/0011393 A1* | 1/2020 | Muha | ..................... | F16F 1/376 |
| 2020/0217387 A1* | 7/2020 | Nong | ................... | F16F 15/022 |
| 2021/0293295 A1* | 9/2021 | El-Gawady | ............. | F16F 1/373 |
| 2022/0145957 A1* | 5/2022 | Gilmore | ................. | B60N 2/54 |
| 2023/0116960 A1* | 4/2023 | Jang | ..................... | B41F 16/002 |
| | | | | 428/98 |
| 2024/0344579 A1* | 10/2024 | Natsume | ................ | F16F 1/373 |
| 2024/0384772 A1* | 11/2024 | Shintani | ................. | F16F 3/023 |
| 2025/0314283 A1* | 10/2025 | Jing | ....................... | F16F 15/04 |

FOREIGN PATENT DOCUMENTS

| | | |
|---|---|---|
| JP | 2014-532301 A | 12/2014 |
| JP | 6197251 B2 | 9/2017 |
| WO | 2020/61196 A1 | 3/2020 |

OTHER PUBLICATIONS

Aug. 31, 2021 Search Report issued in International Patent Application No. PCT/JP2021/028338.

* cited by examiner

Displacement [mm]

STRUCTURE

TECHNICAL FIELD

The present disclosure relates to a structure.

BACKGROUND

Conventionally, a structure is proposed that includes a mass body, a coil spring connected to the mass body and a bottom, and first and second elastic beams connected to the mass body and a frame and having opposite stiffness to each other (see Japanese Patent Literature 1). Paragraph 0017 of Japanese Patent Document 1 states that "the motion mass body 2 is configured to experience a predetermined stiffness within a predetermined travel range of the motion mass body 2, and the predetermined stiffness is zero or approximately zero stiffness preferably."

CITATION LIST

Patent Literature

PTL1: Japanese Patent No. 6197251

SUMMARY

The above-mentioned structure disclosed in Japanese Patent Document 1 does not take into account that the frame supporting the first and second elastic beams may be deformed due to displacement of the first and second elastic beams. When the frame is deformed due to the displacement of the first and second elastic beams by the force applied to the mass body, the stiffness of the first and second elastic beams may change from their original stiffness, and as a result, it may be difficult for the mass body to provide the zero or approximately zero stiffness within the predetermined travel range of the mass body.

According to one aspect of the present disclosure, the following structure is provided. The structure includes a pressure receiving section configured to receive an external pressing force or a reaction force due to the pressing force. The structure further includes a frame section, a first elastic section that is connected to the pressure receiving section and to the frame section and has positive stiffness in any displacement range of the pressure receiving section, a second elastic section that is connected to the pressure receiving section and to the frame section and has negative stiffness in a predetermined displacement range of the pressure receiving section, and a deformation suppressing section that is connected to the frame section and is configured to suppress deformation of the frame section due to deformation of the second elastic section by displacement of the pressure receiving section.

Other features and advantages of the present disclosure can be understood from following description and accompanying drawings, which are given illustratively and non-exhaustively.

DESCRIPTION OF EMBODIMENTS

The following describes some aspects of the disclosure with reference to embodiments.

Figure 1:
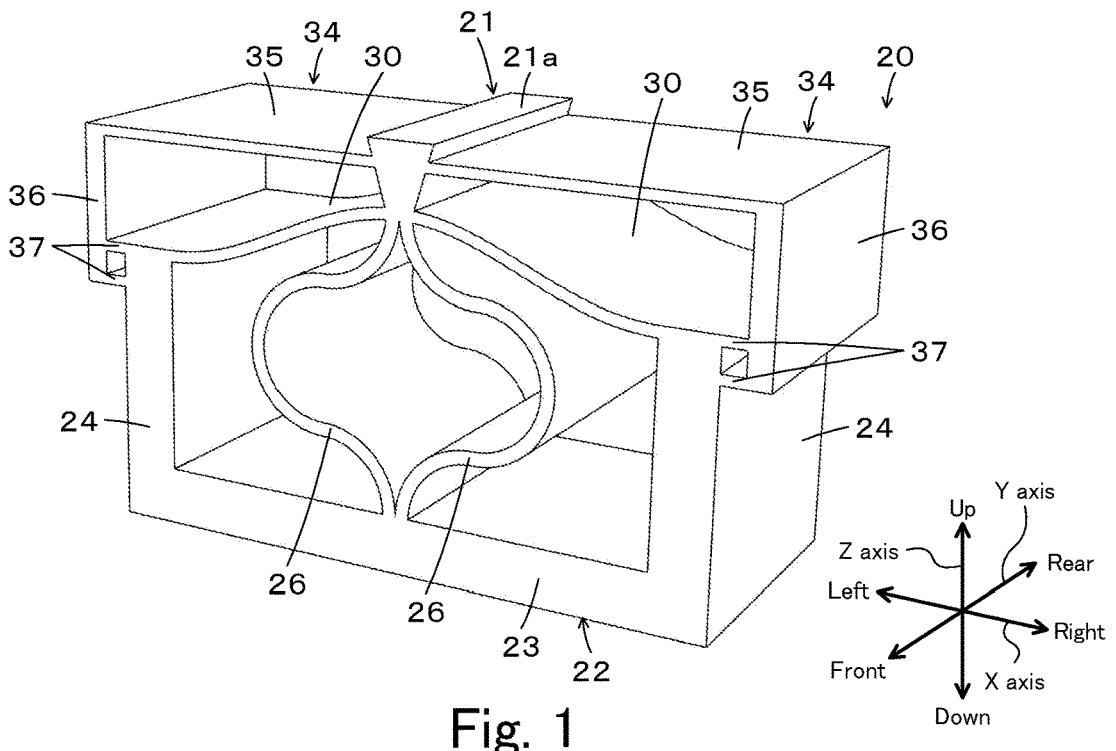
FIG. 1 is an external perspective view of a structure 20 according to one embodiment.
Figure 2:
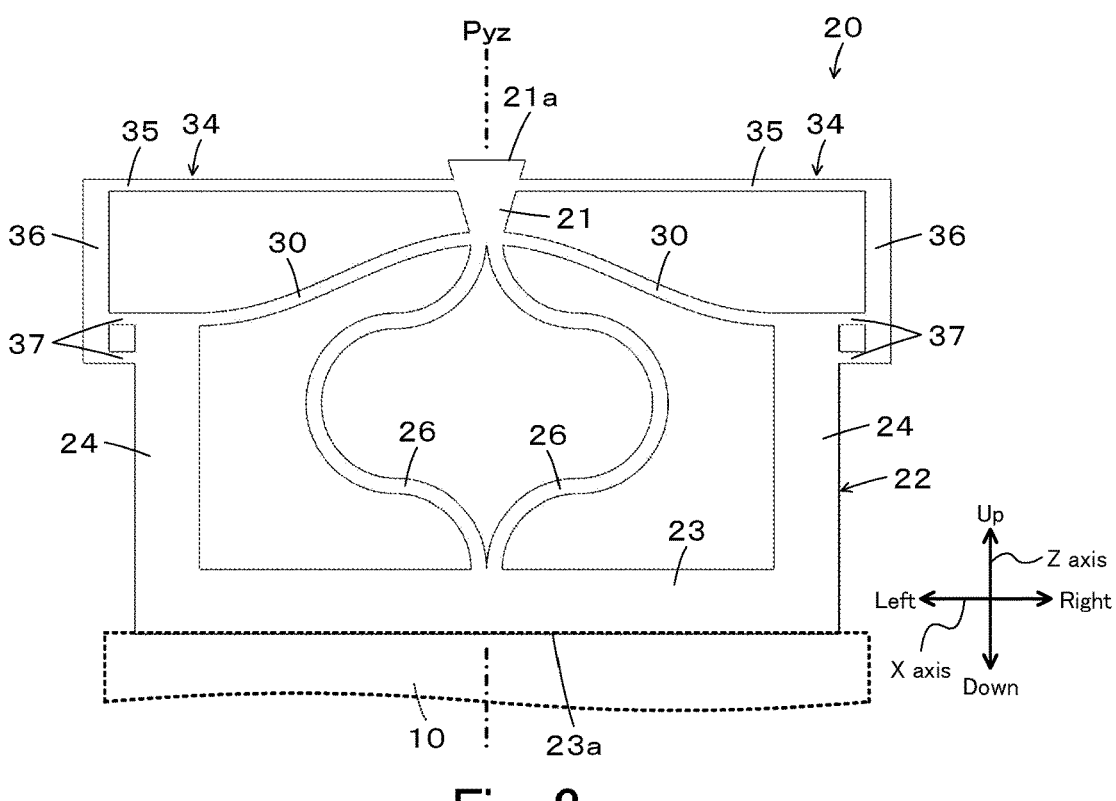
FIG. 2 is a front view of the structure 20.

FIG. 1 is an external perspective view of a structure 20 according to one embodiment of the present disclosure, and FIG. 2 is a front view of the structure 20 of the embodiment. In the embodiment, the left-right direction (X-axis direction), forward-rearward direction (Y-axis direction), and upward-downward direction (Z-axis direction) are as shown in FIGS. 1 and 2.

The structure 20 of the embodiment is configured as an integrally molded member that is integrally molded by, for example, injection molding, blow molding, extrusion molding, or 3D printing of resin material or by, for example, casting, forging, pressing, cutting, extrusion molding, or 3D printing of metal material, or the like. As one example, the structure 20 is supported by the base member 10, as shown in FIG. 2.

The structure 20 includes a pressure receiving section 21, a frame section 22, a pair of elastic sections (first elastic section) 26, a pair of elastic sections (second elastic section) 30, and a pair of beam sections (deformation suppressing section) 34, as shown in FIGS. 1 and 2. The structure 20 is formed to be a mirror image (plane symmetry) of a predetermined plane Pyz (see FIG. 2), which is the YZ plane passing through a center of gravity of the structure 20, and a depth (length in the forward-rearward direction) of each part is constant.

The pressure receiving section 21 is located in the center of the structure 20 in the left-right direction, and the top surface 21a of the pressure receiving section 21 is formed as a flat surface extending in the left-right direction. This upper surface 21a functions as a pressure receiving surface that receives a downward pressing force (load) from the outside. The frame section 22 has a bottom section 23 and a pair of side wall sections 24. The bottom section 23 is formed to extend in the left-right direction, and the bottom surface 23a of the bottom section 23 is placed (in contact with) or fixed to the base member 10. The pair of side wall sections 24 are each formed to extend upwardly from corresponding ends of the bottom section 23 in the left-right direction.

The pair of elastic sections 26 are each formed to extend from the lower end portion of the pressure receiving section 21 and from the center of the bottom section 23 in the left-right direction, and they are each formed to extend away from the predetermined plane Pyz in a semicircular shape from the connection portion (upper end portion) with the pressure receiving section 21 and the connection portion (lower end portion) with the bottom section 23 toward the central portion, as viewed in the upward-downward direction.

The pair of elastic sections 30 are each formed to extend from the lower end of the pressure receiving section 21 and from the upper end portion of the corresponding side wall section 24, and they are each formed to extend diagonally downward in a sine wave shape from the connection portion with the pressure receiving section 21 to the connection portion with the side wall section 24.

The pair of beam sections 34 each have a first beam section 35, a second beam section 36, and two connection sections 37. The first beam section 35 is formed to extend from the side of the pressure receiving section 21 in a left-right direction to a position slightly farther from the predetermined plane Pyz than the side wall section 24. The second beam section 36 is formed to extend downward from the end of the corresponding first beam section 35 that is far from the pressure receiving section 21. The two connection sections 37 are formed to connect the lower end of the corresponding second beam section 36 and the vicinity of the upper end portion of the corresponding side wall section 24 (near the connection with the elastic section 30) in a left-right direction, spaced in an upward-downward direction. The number of connection sections 37 is not limited to two, but may be one, equal to or higher than three.

Figures 3A, 3B, 3C, 3D:
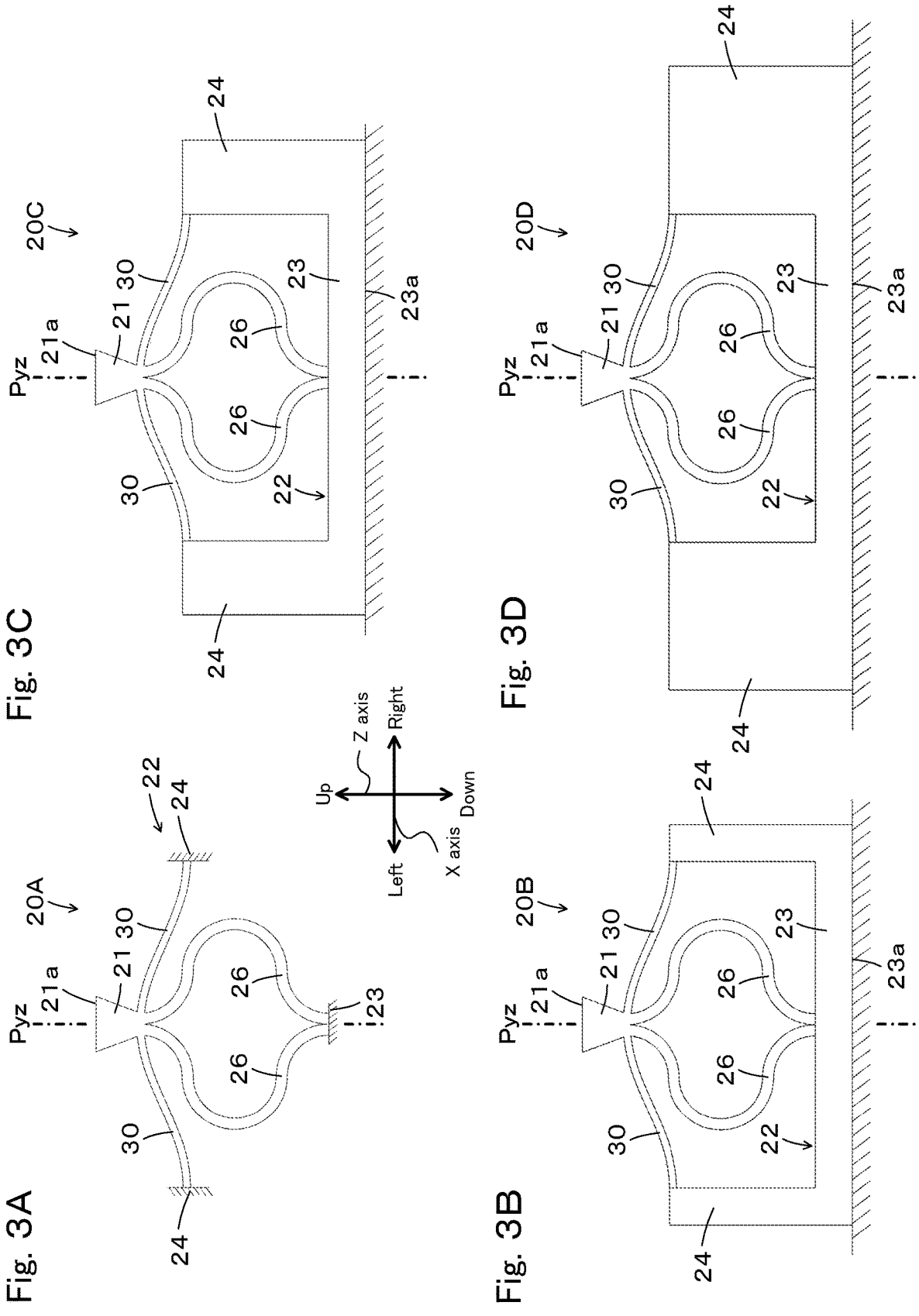
FIG. 3A is a front view of a structure 20A of the comparative example.
FIG. 3B is a front view of a structure 20B of the comparative example.
FIG. 3C is a front view of a structure 20C of the comparative example.
FIG. 3D is a front view of a structure 20D of the comparative example.
Figure 4:
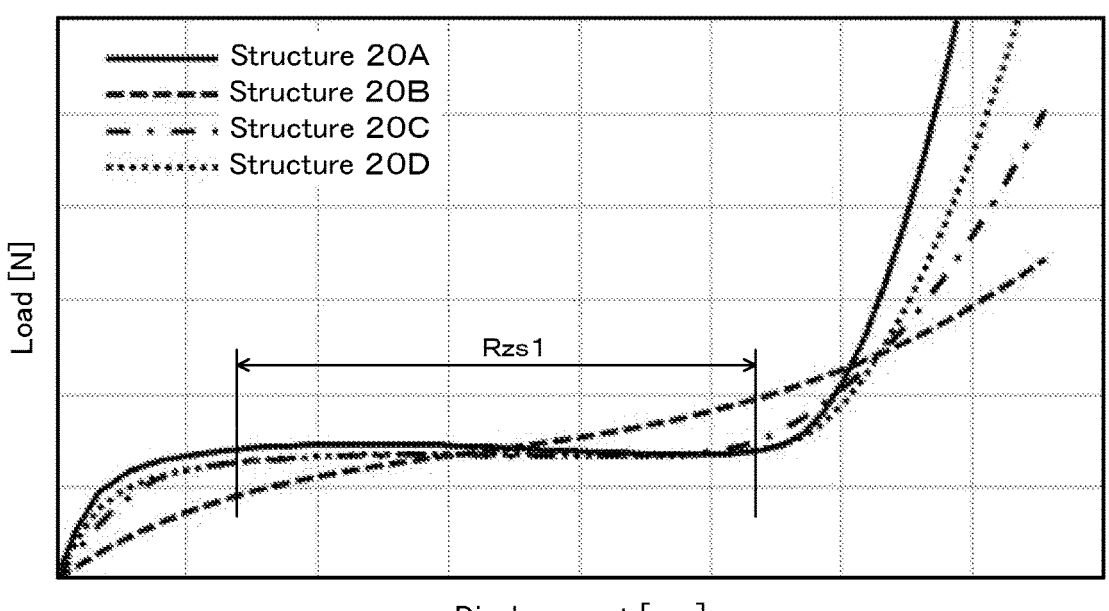
FIG. 4 is a diagram illustrating one example of a relationship between the downward pressing force received on the pressure receiving section 21 from the outside and displacement of the pressure receiving section 21 from its initial position in each of the structures 20A-20D in the comparative examples.

The following describes the operation of each of the structures 20, 20A-20D of the embodiment and comparative examples. FIG. 3(A)-FIG. 3(D) is a front view of each of structures 20A-20D of comparative examples, and FIG. 4 is a diagram illustrating one example of a relationship between the downward pressing force (load) received on the pressure receiving section 21 from the outside and displacement of the pressure receiving section 21 from its initial position in each of the structures 20A-20D of the comparative examples. The structure 20A in FIG. 3(A) is a structure in which the pair of beam sections 34 are removed from the structure 20 of the embodiment, and the frame section 22 is regarded as a rigid body (an object that does not deform when force is applied). The structure 20B in FIG. 3(B) a structure in which the pair of beam sections 34 are removed from the structure 20 of the embodiment. Each of the structures 20C and 20D in FIG. 3(C) and FIG. 3(D) is a structure in which the thickness (length in the left-right direction) of the side wall section 24 of the frame section 22 is about twice or four times that of the structure 20B in FIG. 3(B).

Figure 5:
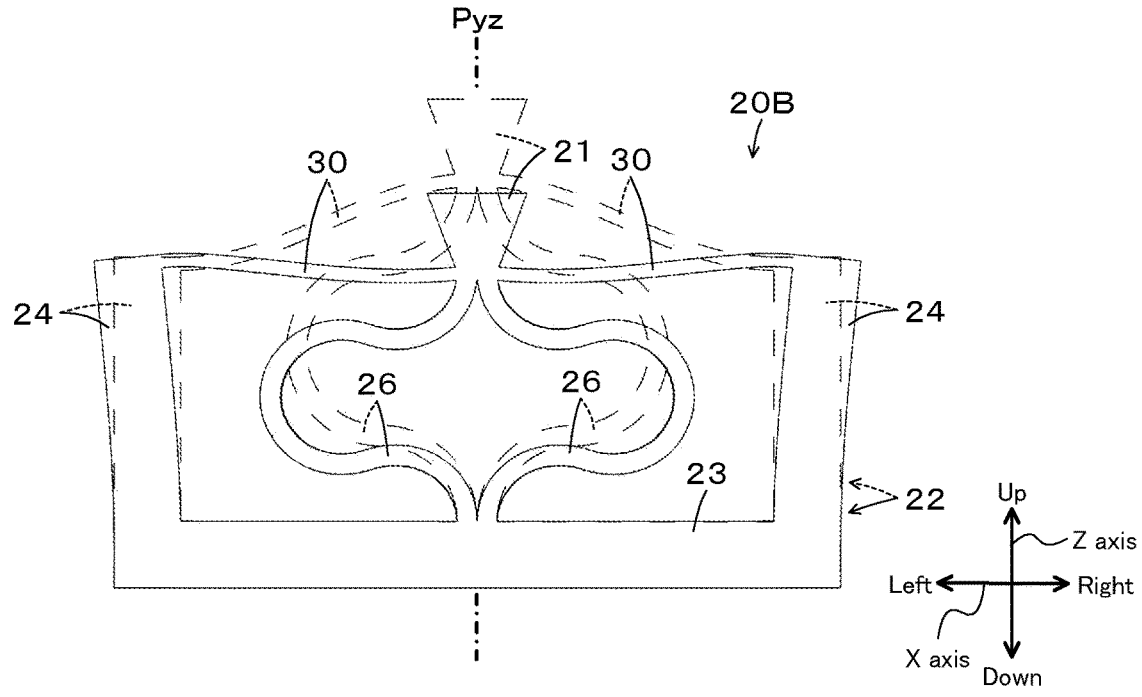
FIG. 5 is a diagram illustrating deformation of the structure 20B.

The first describes the operation of the structures 20A of the comparative example. In the structure 20A of the comparative example, when the downward pressing force (load) acts on the pressure receiving section 21 (top surface 21a) from the outside, the pair of elastic sections 26 and the pair of elastic sections 30 deform as the pressure receiving section 21 moves downward. The pair of elastic sections 26 have positive stiffness in any displacement range of the pressure receiving section 21. The pair of elastic sections 30 have negative stiffness in the displacement range Rzs1 of the pressure receiving section 21 and the positive stiffness in other displacement ranges. The pair of elastic sections 26 and the pair of elastic sections 30 are connected in parallel, and the sum of the stiffness of these two elastic sections 26 and 30 determines the stiffness of the structure 20A. As a result, as shown by the solid line in FIG. 4, the structure 20A can achieve the stiffness that is sufficiently lower in absolute value (e.g., approximately zero stiffness) in the displacement range Rzs1 of the pressure receiving section 21 than in the other displacement ranges thereof. In contrast, with respect to the stiffness of each structure expressed by the slope of each line in FIG. 4, in the case of the structure 20B in FIG. 3(B), the difference in slope of the broken line (i.e., the difference in the stiffness) between the displacement range Rzs1 of the pressure receiving section 21 and the other displacement range is small, as shown by the broken line in FIG. 4, and it is difficult to say that the absolute value of the stiffness is sufficiently low in the displacement range Rzs1 of the pressure receiving section 21. The following may be the reason for this. FIG. 5 is a diagram illustrating deformation of the structure 20B. In the figure, the broken line illustrates the state when the structure 20B is not deformed, and the solid line illustrates the state when the structure 20B is deformed. As shown in FIG. 5, in the structure 20B, when the pair of elastic sections 30 deform as the pressure receiving section 21 moves downward, a force F1 acts outwardly (away from the predetermined plane Pyz) from the pair of elastic sections 30 to the upper end portions of the pair of side wall sections 24, the upper end portions of the pair of side wall portions 24 deform outwardly in a relatively large manner. Therefore, it is assumed that the pair of elastic sections 30 do not achieve adequate negative stiffness in the displacement range Rzs1 of the pressure receiving section 21, and that the absolute value of the stiffness is not sufficiently low as the structure 20B. Based on this, as in each of the structures 20C, 20D in FIG. 3(C) and FIG. 3(D), in the case where the thickness of the side wall sections 24 of the frame section 22 is increased, when the pair of elastic sections 30 are deformed as the pressure receiving section 21 moves downward, the deformation of the upper end portions of the pair of side wall portions 24 can be suppressed as the elastic sections 30 deform. Thereby, in the structures 20C and 20D, the pair of elastic sections 30 can achieve the appropriate negative stiffness in the displacement range Rzs1 of the pressure receiving section 21, compared to the structure 20B. As a result, as shown by the single-dashed and dotted lines in FIG. 4, the properties of the structures 20C and 20D can be closer to those of the structure 20A (see broken line) than to those of the structure 20B (see solid line). However, in these cases, the sizes of structures 20C and 20D become large, and therefore, for example, in cases where the design space for installing or embedding the structures is restricted, it may not be possible to mount the structures.

Figure 6:
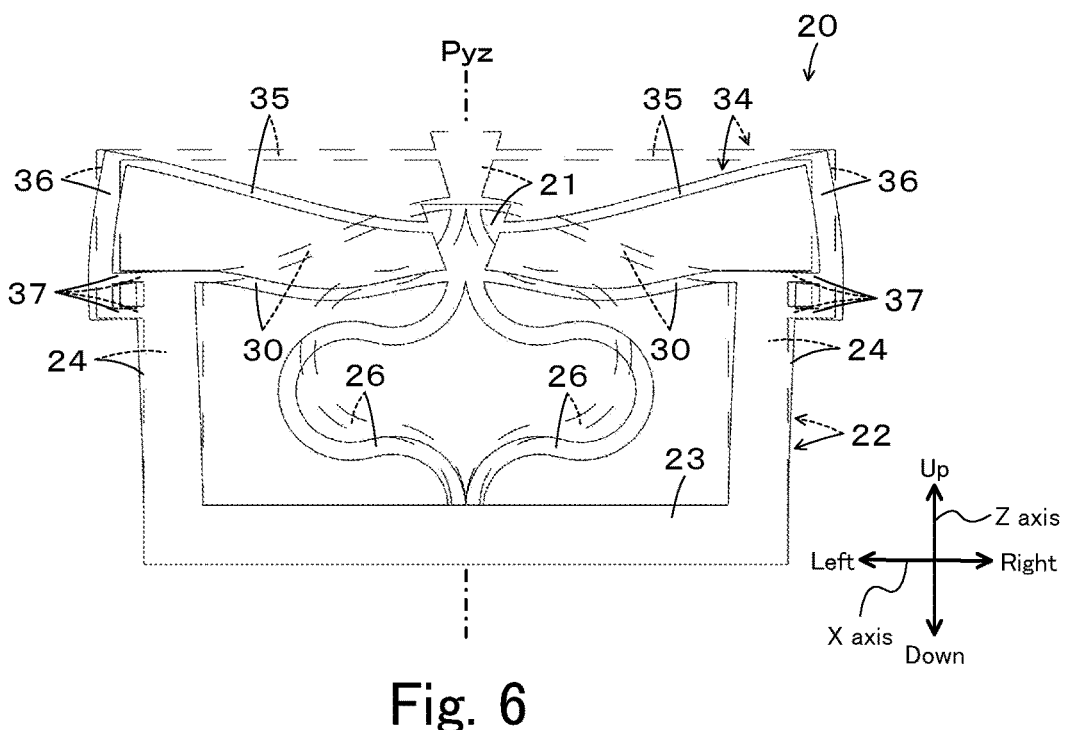
FIG. 6 is a diagram illustrating deformation of the structure 20.
Figure 7:
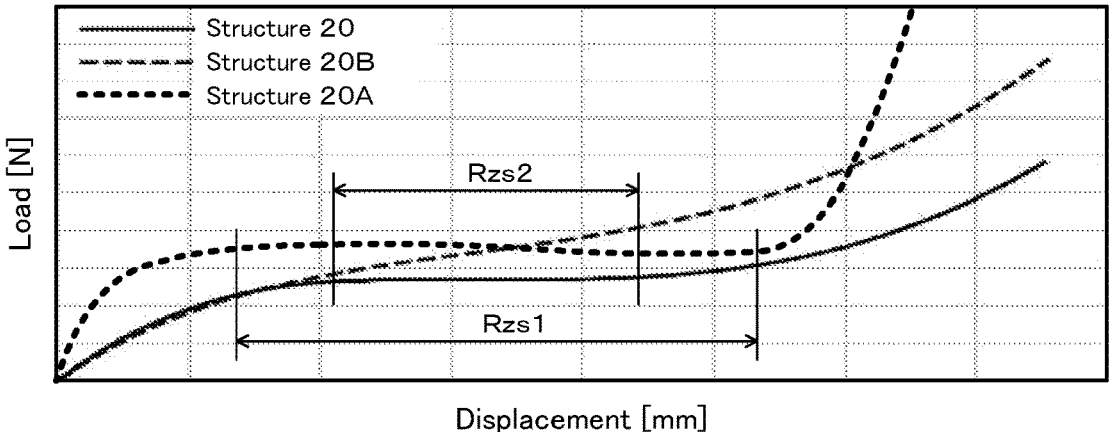
FIG. 7 is a diagram illustrating one example of a relationship between the downward pressing force received on the pressure receiving section 21 from the outside and the displacement of the pressure receiving section 21 from its initial position in each of the structures 20, 20A and 20B of the embodiment and comparative examples.

The following describes the operation of the structure 20 of the embodiment. FIG. 6 is a diagram illustrating deformation of the structure 20. FIG. 7 is a diagram illustrating one example of a relationship between the downward pressing force (load) received from the outside to the pressure receiving section 21 and the displacement of the pressure receiving section 21 from its initial position in each of the structures 20, 20A and 20B of the embodiment and comparative examples. In FIG. 6, the broken line illustrates the state when the structure 20 is not deformed, and the solid line illustrates the state when the structure 20 is deformed. As shown in FIG. 6, in the embodiment structure 20, when the pair of elastic sections 30 deform as the pressure receiving section 21 moves downward, as in the structure 20B of the comparative example (see FIG. 5), the force F1 acts outwardly (away from the predetermined plane Pyz) from the pair of elastic sections 30 to the upper end portions of the pair of side wall sections 24, however, due to the deformation with bending of the pair of beam sections 34 connecting the pressure receiving section 21 and the upper end portions of the pair of side wall sections 24, a force F2 canceling at least a part of the force F1 acts on the upper end portions of the pair of side wall sections 24 from the pair of beam sections 34, and the outward deformation of the upper end portions of the pair of side wall sections 24 can be suppressed. Thereby, the pair of elastic sections 30 can achieve the appropriate negative stiffness in the displacement range Rzs2 of the pressure receiving section 21. As a result, as shown by the solid and broken lines in FIG. 7, the structure 20 of the embodiment can achieve the stiffness that: is sufficiently lower in absolute value (e.g., approximately zero stiffness) in the displacement range Rzs2 of the pressure receiving section 21 than in the other displacement ranges thereof, compared to the structure 20B of the comparative example. In the embodiment structure 20, in addition to the pair of elastic sections 26, the pair of beam sections 34 also have the positive stiffness in any displacement range of the pressure receiving section 21. Therefore, the total positive stiffness values of the structure 20 of the embodiment and the structure 20A in the comparison example are different, this causes the displacement range Rzs2 in the structure 20 of the embodiment and the displacement range Rzs1 in the structure 20A in the comparison example to be different. The displacement range that can achieve sufficiently low stiffness can be adjusted by setting the stiffness of each of the elastic sections 26, 30 and beam sections 34 to configure them accordingly.

Figure 8:
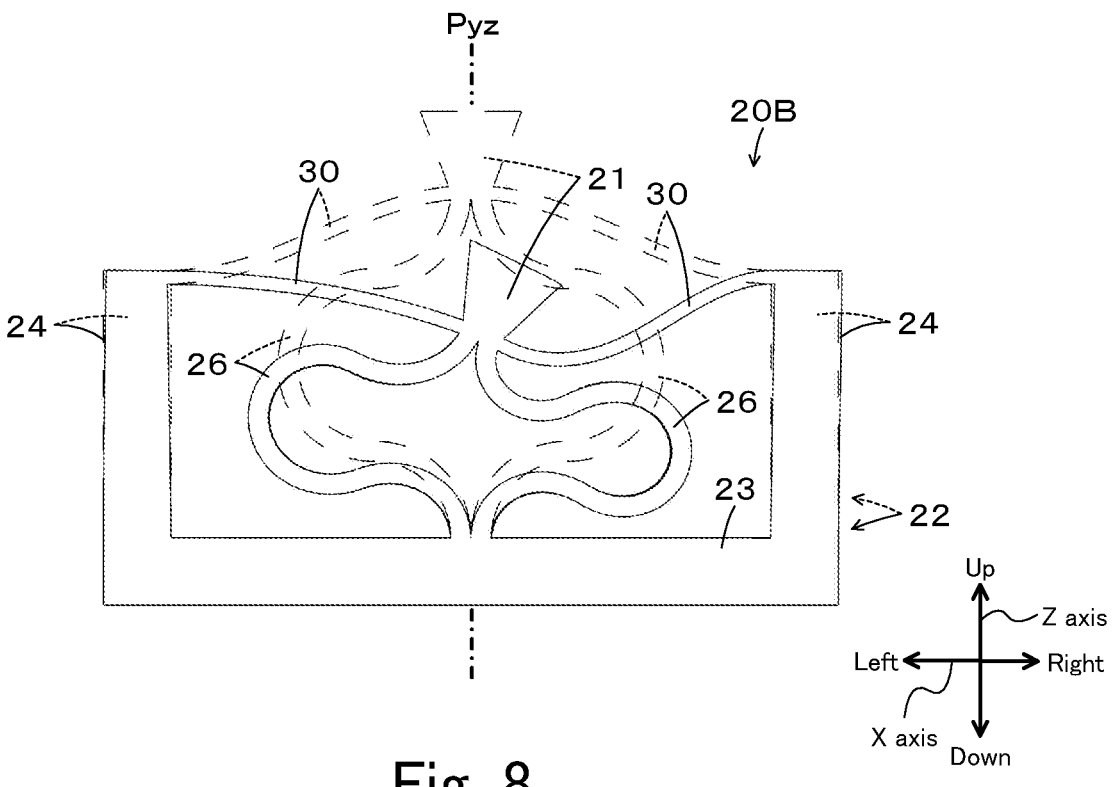
FIG. 8 is a diagram illustrating the deformation of structure 20B.

In the structure 20B of the comparative example, when the pressure receiving section 21 is slightly deviated from the mirror image with respect to the predetermined plane Pyz due to manufacturing variations, or when the pressing force acting on the pressure receiving section 21 from the outside is slightly tilted around the Y axis with respect to the downward direction, the pressing force acting on the pressure receiving section 21 from the outside may cause an unintended displacement of the pressure receiving section 21, and an unintended deformation of the pair of elastic sections 26 and a pair of elastic sections 30. For example, as shown in the deformation of the structure 20B in FIG. 8, the pressure receiving section 21 may rotate around the Y axis, causing the pair of elastic sections 26 and the pair of elastic sections 30 to deform differently from each other. In this case, the switch between the positive stiffness and the negative stiffness may not occur properly in the elastic section 30 of the structure 20B, making it more difficult to achieve the stiffness that is sufficiently low in absolute value in the displacement range Rzs1 of the pressure receiving section 21. The same can be considered for structures 20A, 20C, and 20D. In contrast to these, the structure 20 of the embodiment has a pair of beam sections 34 that connect to the upper end portions of the pair of side wall sections 24, each of which also connects to the side portions of the pressure receiving section 21, so that the unintended displacement of the pressure receiving section 21 can be suppressed, and the unintended deformation of the pair of elastic sections 26 and 30 can be suppressed. As a result, in the structure 20, even when the pressure receiving section 21 is slightly deviated from the mirror image with respect to the predetermined plane Pyz, or when the pressing force acting on the pressure receiving section 21 from the outside is slightly tilted around the Y axis with respect to the downward direction, the structure 20 can stably achieve the stiffness that is sufficiently lower in absolute value (e.g., approximately zero stiffness) in the displacement range Rzs2 of the pressure receiving section 21 than in the other displacement ranges thereof, compared to the structures 20A to 20D of the comparative examples.

The structure 20 of the embodiment described above, in addition to including the pressure receiving section 21, the frame section 22, the pair of elastic sections 26, and the pair of elastic sections 30, it also includes the pair of beam sections 34 that connect to the side of the pressure receiving section 21 and near the upper end portion of the corresponding side wall section 24 (near the connection with the elastic section 30), respectively. As a result, without increasing the size of the structure 20 (especially the size of the frame section 22), the frame section 22 supporting the elastic section 30 can be suppressed from being displaced as the elastic section 30 is displaced, and the structure 20 can achieve the stiffness that is sufficiently lower in absolute value (e.g., approximately zero stiffness) in the displacement range Rzs2 of the pressure receiving section 21 than in the other displacement ranges thereof.

In the embodiment, the structure 20 is arranged in the orientation shown in FIG. 1 and FIG. 2, with the bottom surface 23a of the bottom section 23 of the frame section 22 placed (in contact with) or fixed to the base member 10, and the top surface 21a of the pressure receiving section 21 receiving the downward pressing force (load) from the outside. Alternatively, however, the structure 20 may be arranged in the orientation shown in FIG. 1 and FIG. 2, with the top surface 21a of the pressure receiving section 21 in contact with or fixed to another base member (not shown), and the bottom surface 23a of the bottom section 23 receiving an upward pressing force from the outside. In this case, the pressure receiving section 21 is subjected to a reaction force from an external pressing force. In this case, the pressure receiving section 21 receives a reaction force due to the external pressing force. The structure 20 may be arranged vertically opposite to the orientation shown in FIG. 1 and FIG. 2. In this case, the pressure receiving section 21 may receive the external pressing force or the reaction force due to the external pressing force.

Figure 9:
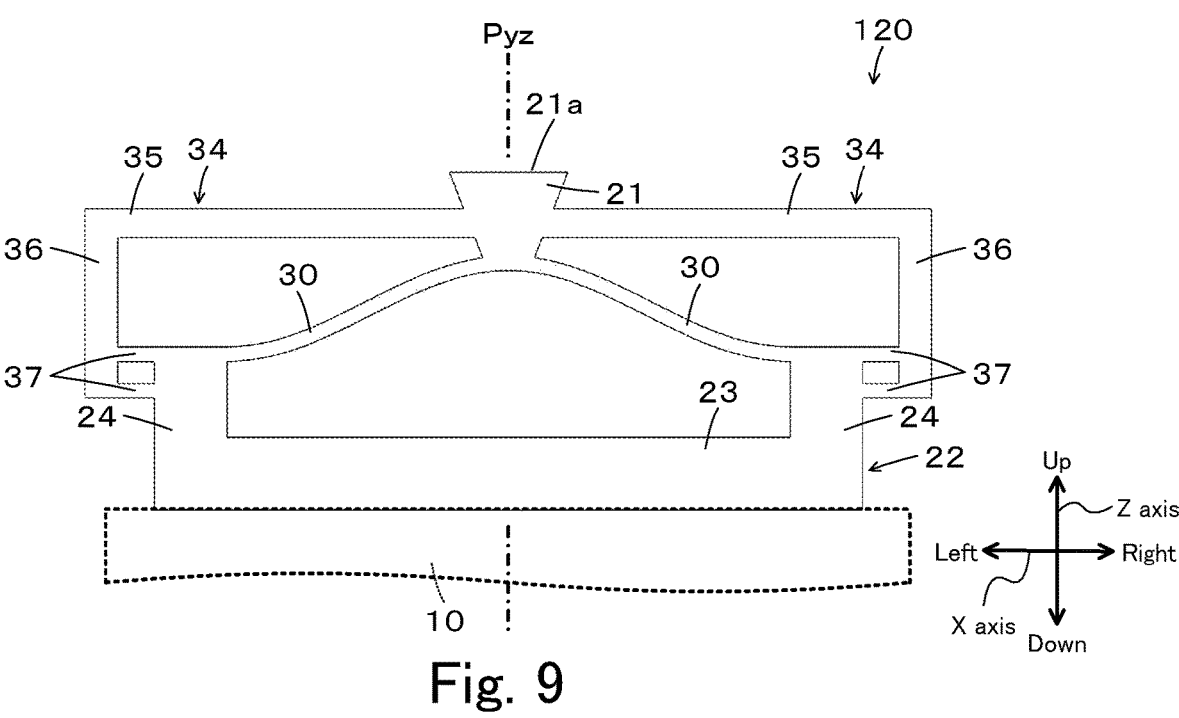
FIG. 9 is a front view of a structure 120 of a modification.
Figure 10:
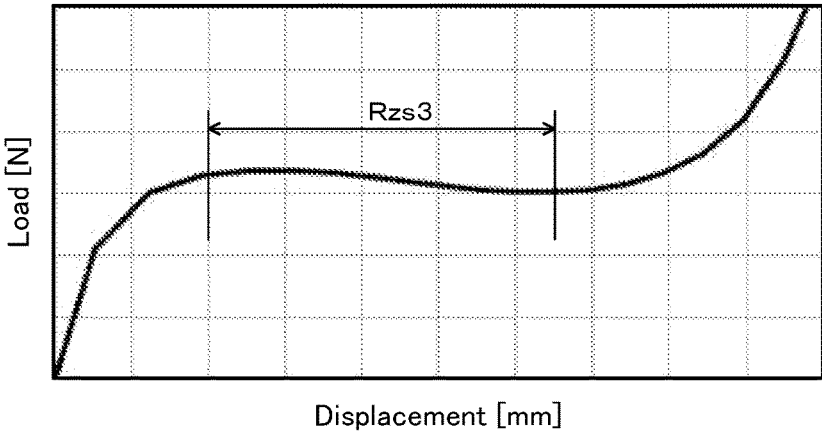
FIG. 10 is a diagram illustrating one example of a relationship between the downward pressing force (load) received on the pressure receiving section 21 from the outside and the displacement of the pressure receiving section 21 from its initial position in the structure 120 of the modification.

In the embodiment, the structure 20 includes the pressure receiving section 21, the frame section 22, the pair of elastic sections 26, the pair of elastic sections 30, and the pair of beam sections 34. However, as shown in a structure 120 of a modification in FIG. 9, the pair of elastic sections 26 may be removed from the structure 20 of the embodiment. FIG. 10 is a diagram illustrating one example of a relationship between the downward pressing force (load) received on the pressure receiving section 21 from the outside and the displacement of the pressure receiving section 21 from its initial position in the structure 120 of the modification. As mentioned above, in the structure 20, the pair of elastic sections 26 as well as the pair of beam sections 34 have the positive stiffness in any displacement range of the pressure receiving section 21. Therefore, the same effect as in the embodiment can be achieved in the structure 120 removing the pair of elastic sections 26 from the structure 20 by configuring the beam section 34 and the elastic section 30 so that the combined stiffness of the positive stiffness of the beam section 34 and the negative stiffness of the elastic section 30 is zero or approximately zero. That is, as shown in FIG. 10, the structure 120 can achieve the stiffness that is sufficiently lower in absolute value (e.g., approximately zero stiffness) in the displacement range Rzs3 of the pressure receiving section 21 than in the other displacement ranges thereof. In addition, since the structure 120 is a structure that removes the pair of elastic sections 26 from the structure 20, the structure 120 can be simpler and smaller in size compared to the structure 20. Furthermore, by shortening the length of the pair of side walls 24 in the upward-downward direction compared to the structure 20, the structure 120 can better suppress the deformation of the upper end portions of the pair of side wall sections 24 as a result of the deformation of the pair of elastic sections 30 as the pressure receiving section 21 moves downward, and the pair of elastic sections 30 can achieve a more adequate negative stiffness in the displacement range Rzs3 of the pressure receiving section 21.

Figure 11:
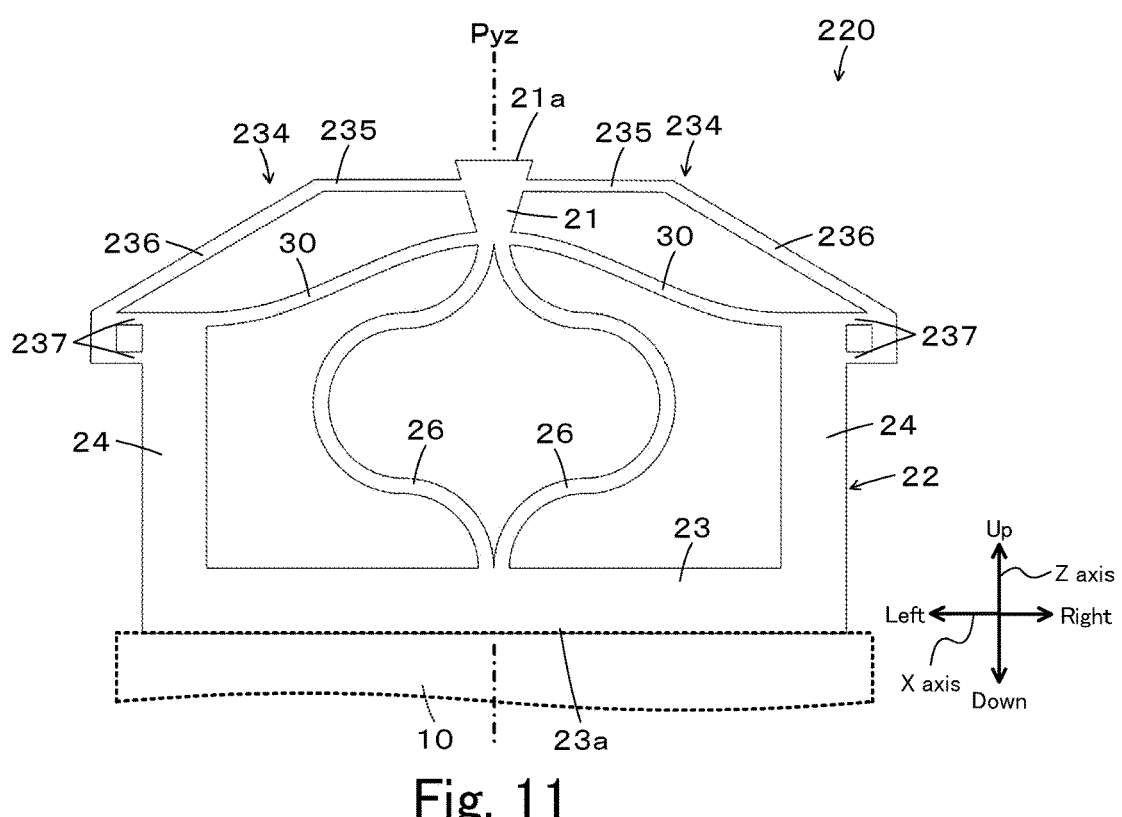
FIG. 11 is a front view of a structure 220 of the modification.
Figure 12:
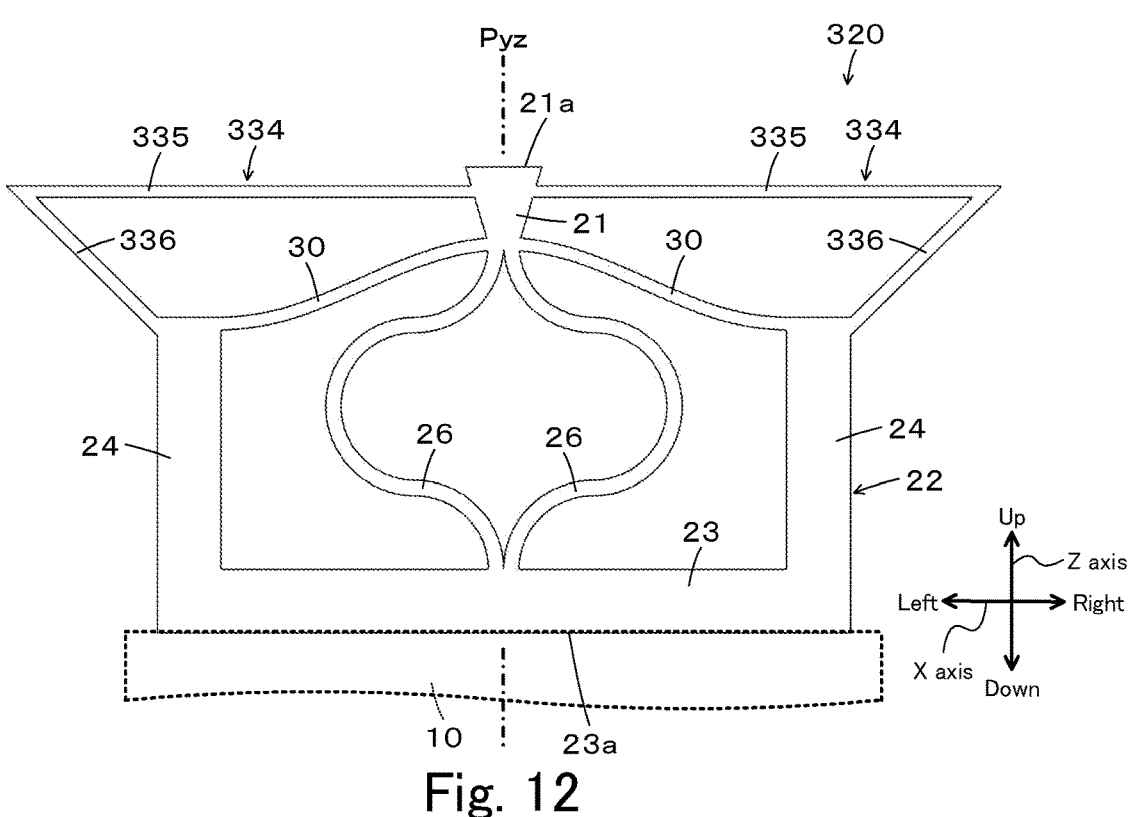
FIG. 12 is a front view of a structure 320 of the modification.

In each of the embodiment and modifications, in each of the pairs of beam sections 34 of the structures 20 and 120, the first beam section 35 is formed to extend from the side of the pressure receiving section 21 in the left-right direction to a position slightly farther from the predetermined plane Pyz than the side wall section 24, the second beam section 36 is formed to extend downward from the end portion of the corresponding first beam section 35, and the connection section 37 is formed to connect the lower end portion of the corresponding second beam section 36 with the vicinity of the upper end portion of the corresponding side wall section 24. However, it is not limited to this. For example, as shown in a structure 220 of the modification in FIG. 11, in the pair of beam portions 234, the first beam section 235 may be formed to extend from the side of the pressure receiving section 21 in a left-right direction to a position closer to the predetermined plane Pyz than the side wall section 24, the second beam section 236 may be formed to extend from an end portion of the corresponding first beam section 235 and extend downward while being spaced from the predetermined plane Pyz, and the connection section 237 may be formed to connect the lower end portion of the corresponding second beam section 236 with the vicinity of the upper end portion of the corresponding side wall section 24. As shown in a structure 320 of the modification in FIG. 12, in the pair of beam portions 334, the first beam section 335 may be formed to extend from the side of the pressure receiving section 21 in a left-right direction to a position some farther from the predetermined plane Pyz than the side wall section 24, and the second beam section 336 may be formed to extend from the end portion of the corresponding first beam section 335 and extend downward while approaching the predetermined plane Pyz to connect to the vicinity of the upper end portion of the corresponding side wall section 24. The pair of elastic sections 26 may be removed from the structures 220, 320.

In the embodiment and modifications, the pair of beam sections 34 of each of the structures 20, 120, 220 and 320 are each connected to the side of the pressure receiving section 21. However, the pair of beam sections 34 may be connected to each other without connecting to the pressure receiving section 21.

In the embodiment and modifications, the pair of elastic sections 26 of each of the structures 20, 120, 220 and 320 are each formed to extend away from the predetermined plane Pyz in the semicircular shape from the connection portion (upper end portion) with the pressure receiving section 21 and the connection portion (lower end portion) with the bottom section 23 toward the central portion, as viewed in the upward-downward direction. However, the elastic section 26 is not limited to this, and may be any member as long as it has the positive stiffness in any displacement range of the pressure receiving section 21. For example, the elastic section 26 may be formed in a shape of a coil spring or the like, with one instead of a pair (two).

In the embodiment and modifications, the pair of elastic sections 30 of each of the structures 20, 120, 220 and 320 are each formed to extend diagonally downward in the sine wave shape from the connection portion with the pressure receiving section 21 to the connection portion with the side wall section 24. However, the elastic section 30 is not limited to this, and may be any member as long as it has the negative stiffness in the predetermined displacement range of the pressure receiving section 21 and the positive stiffness in the other displacement ranges thereof. For example, the elastic section 30 may be formed by a straight beam.

In the embodiments and modifications, each of the structures 20, 120, 220 and 320 is formed to be a mirror image (plane symmetry) of the predetermined plane Pyz, which is the YZ plane passing through the center of the gravity of each of the structures 20 and 120. That is, the structures 20 and 120 include two elastic elements, one on one side (e.g., on the right side) of the predetermined plane Pyz, which are rotationally symmetric at a distance of 180 degrees around the axis Lz which is a straight line in the upward-downward direction passing through the center of the gravity of the structures 20 and 120 (a straight line passing through the center of the pressure receiving section 21 in the left-right and forward-rearward direction and the center of the bottom section 23 in the left-right and forward-rearward direction). However, the structure may include three or four elastic elements which are rotationally symmetric at a distance of 120 or 90 degrees around the axis Lz. Alternatively, the structure may be a rotational body which is obtained by rotating a cross section of a predetermined plane Pxz, which is an XZ plane passing through the center of the gravity (axis Lz) (a cross section having the same shape as the front view of the structures 20 and 120 in FIG. 2 and FIG. 9), 180 degrees around the axis Lz, in the structures 20 and 120.

In the embodiment and modified examples, each of the structure 20 and 120 is configured as the integrally molded member integrally molded from the resin material, the metal material, or the like. However, the structure may be formed as a plurality of parts and joined together.

The following describes the correspondence relationship between the primary elements of the above embodiment and the primary elements of the disclosure described in Summary. In the embodiment, the frame section 22 corresponds to the "frame section", the elastic section 26 corresponds to the "first elastic section", the elastic section 30 corresponds to the "second elastic section", and the beam section 34 corresponds to the "deformation suppressing section".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

ADDITIONAL NOTES

The structure includes a pressure receiving section configured to receive an external pressing force or a reaction force due to the pressing force. The structure further includes a frame section, a first elastic section that is connected to the pressure receiving section and to the frame section and has positive stiffness in any displacement range of the pressure receiving section, a second elastic section that is connected to the pressure receiving section and to the frame section and has negative stiffness in a predetermined displacement range of the pressure receiving section, and a deformation suppressing section that is connected to the frame section and is configured to suppress deformation of the frame section due to deformation of the second elastic section by displacement of the pressure receiving section. According to the structure of the present disclosure, when the second elastic section is deformed by the displacement of the pressure receiving section, the deformation of the frame section due to the deformation of the second elastic section can be suppressed. Therefore, the second elastic section can achieve the adequate negative stiffness in the predetermined displacement range of the pressure receiving section, the structure can achieve the stiffness that is sufficiently lower in absolute value (e.g., approximately zero stiffness) in the predetermined displacement range of the pressure receiving section than in the other displacement ranges thereof. That is, without increasing the size of the frame section, the frame section supporting the elastic section can be suppressed from being displaced as the elastic section is displaced, and the structure can achieve the stiffness that is lower in absolute value in the predetermined displacement range of the pressure receiving section than in the other displacement ranges thereof.

In the structure of the present disclosure, the deformation suppressing section may be configured to suppress the deformation of the frame section by applying a second force that cancels at least part of a first force to the frame section when the first force acts on the frame section from the second elastic section due to the deformation of the second elastic section by the displacement of the pressure receiving section.

In the structure of the present disclosure, the deformation suppressing section may be configured to connect to the pressure receiving section. In this way, unintended displacement of the pressure receiving section (e.g., rotation around an orthogonal axis perpendicular to the direction of the pressure receiving force) can be suppressed when the pressing force acts on the pressure receiving section from the outside, and unintended deformation of the first and second elastic section can be suppressed.

In the structure of the present disclosure, the deformation suppressing section may be used concurrently with the first elastic section. In this way, the structure can be simplified and the size can be reduced.

In the structure of the present disclosure, the second elastic section may be formed in a shape of a sine wave. The structure may include a plurality of elastic elements, each having the frame section, the first elastic section, the second elastic section, and the deformation suppressing section, around an axis passing through a first position of the pressure receiving section and a second position of the frame section. The structure may be a rotational body structure which is obtained by rotating a cross section for forming the frame section, the first elastic section, the second elastic section, and the deformation suppressing section, around a predetermined axis. The structure may be an integrally molded member.

The invention claimed is:

1. A structure that includes a pressure receiving section configured to receive an external pressing force or a reaction force due to the pressing force, the structure comprising:
   a frame section;
   a first elastic section that is connected to the pressure receiving section and to the frame section and has positive stiffness in any displacement range of the pressure receiving section;
   a second elastic section that is connected to the pressure receiving section and to the frame section and has negative stiffness in a predetermined displacement range of the pressure receiving section; and
   a deformation suppressing section that is connected to the frame section and is configured to suppress deformation of the frame section due to deformation of the second elastic section by displacement of the pressure receiving section.

2. The structure according to claim 1,
   wherein the deformation suppressing section is configured to suppress the deformation of the frame section by applying a second force that cancels at least part of a first force to the frame section when the first force acts on the frame section from the second elastic section due to the deformation of the second elastic section by the displacement of the pressure receiving section.

3. The structure according to claim 1,
   wherein the deformation suppressing section is configured to connect to the pressure receiving section.

4. The structure according to claim 1,
   wherein the deformation suppressing section is used concurrently with the first elastic section.

5. The structure according to claim 1,
   wherein the second elastic section is formed in a shape of a sine wave.

6. The structure according to claim 1, comprising:
   a plurality of elastic elements, each having the frame section, the first elastic section, the second elastic section, and the deformation suppressing section, around an axis passing through a first position of the pressure receiving section and a second position of the frame section.

7. The structure according to claim 1,
   wherein the structure is a rotational body structure which is obtained by rotating a cross section for forming the frame section, the first elastic section, the second elastic section, and the deformation suppressing section, around a predetermined axis.

8. The structure according to claim 1,
   wherein the structure is an integrally molded member.

* * * * *